United States Patent
Parthasarathy et al.

(10) Patent No.: US 12,079,153 B2
(45) Date of Patent: *Sep. 3, 2024

(54) DYNAMIC CONFIGURATION OF INPUT/OUTPUT CONTROLLER ACCESS LANES

(71) Applicant: Intel Corporation, Santa Clara, CA (US)

(72) Inventors: Balaji Parthasarathy, Phoenix, AZ (US); Ramamurthy Krithivas, Gilbert, AZ (US); Bradley Burres, Newton, MA (US); Pawel Szymanski, Gdansk (PL); Yi-Feng Liu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,042

(22) Filed: May 18, 2023

(65) Prior Publication Data
US 2023/0367729 A1 Nov. 16, 2023

Related U.S. Application Data

(63) Continuation of application No. 17/207,135, filed on Mar. 19, 2021, now Pat. No. 11,693,807, which is a
(Continued)

(51) Int. Cl.
*G06F 13/40* (2006.01)
*G06F 9/4401* (2018.01)
*G06F 9/445* (2018.01)

(52) U.S. Cl.
CPC ........ *G06F 13/4027* (2013.01); *G06F 9/4403* (2013.01); *G06F 9/4418* (2013.01); *G06F 9/44505* (2013.01); *G06F 13/4022* (2013.01)

(58) Field of Classification Search
CPC ......... G06F 13/14; G06F 13/40; G06F 13/364
(Continued)

(56) References Cited

U.S. PATENT DOCUMENTS 7,124,376 B2 10/2006 Zaidi et al.
7,174,411 B1 2/2007 Ngai
(Continued)

FOREIGN PATENT DOCUMENTS

EP 0982666 A2 3/2000

OTHER PUBLICATIONS

Advisory Action for U.S. Appl. No. 15/554,205, Mailed May 22, 2019, 3 pages.
(Continued)

*Primary Examiner* — Titus Wong
(74) *Attorney, Agent, or Firm* — Nicholson De Vos Webster & Elliott LLP

(57) ABSTRACT

Generally, this disclosure provides systems, devices, methods and computer readable media for dynamic configuration and enforcement of access lanes to I/O controllers. The System may include a plurality of Input/Output (I/O) controllers and a plurality of lanes. The system may also include a lane mapping module configured to multiplex at least one of the I/O controllers to at least one of the lanes based on a configuration. The system may further include a first processor configured to detect a change request, the change request to modify the configuration from an existing configuration to a new configuration; and a second processor configured to: verify that the new configuration is valid based on a stock keeping unit (SKU) associated with the system; and, if the verification is successful, store the new configuration in non-volatile memory and reset the system.

26 Claims, 6 Drawing Sheets

Related U.S. Application Data continuation of application No. 16/566,576, filed on Sep. 10, 2019, now Pat. No. 10,956,351, which is a continuation of application No. 15/554,205, filed as application No. PCT/US2015/023043 on Mar. 27, 2015, now abandoned.

(58) Field of Classification Search
USPC .......................................................... 710/104
See application file for complete search history.

(56) References Cited

U.S. PATENT DOCUMENTS

| | | | |
|---|---|---|---|
| 7,917,729 | B2 | 3/2011 | Georgiou et al. |
| 8,478,916 | B2 | 7/2013 | Asnaashari |
| 8,601,254 | B1 | 12/2013 | Kutz et al. |
| 8,612,663 | B1 | 12/2013 | Lee |
| 8,677,047 | B1 | 3/2014 | Chang |
| 8,887,262 | B1 | 11/2014 | Turner et al. |
| 8,893,013 | B1* | 11/2014 | Groves ............... G06F 3/1454 715/740 |
| 9,946,676 | B2 | 4/2018 | Wagh et al. |
| 2004/0088469 | A1 | 5/2004 | Levy |
| 2004/0222300 | A1 | 11/2004 | Strickland |
| 2005/0097499 | A1 | 5/2005 | Sun et al. |
| 2005/0102454 | A1 | 5/2005 | McAfee et al. |
| 2005/0147117 | A1* | 7/2005 | Pettey ................ H04L 49/356 370/463 |
| 2005/0232255 | A1 | 10/2005 | Walton et al. |
| 2006/0161421 | A1* | 7/2006 | Kissell ............... G06F 9/4812 703/26 |
| 2008/0005586 | A1 | 1/2008 | Munguia |
| 2009/0212113 | A1 | 8/2009 | Chiu et al. |
| 2009/0241110 | A1* | 9/2009 | Heo .................... G06F 9/45537 718/1 |
| 2011/0161672 | A1 | 6/2011 | Martinez et al. |
| 2012/0158919 | A1 | 6/2012 | Aggarwal et al. |
| 2013/0007332 | A1* | 1/2013 | Teh ..................... G06F 13/4022 710/313 |
| 2013/0145180 | A1* | 6/2013 | Branover ............. G06F 1/32 713/300 |
| 2013/0151748 | A1 | 6/2013 | Yang et al. |
| 2013/0238823 | A1 | 9/2013 | Terlizzi et al. |
| 2013/0304942 | A1 | 11/2013 | Golembeski et al. |
| 2014/0047230 | A1* | 2/2014 | Khosravi ............. G06F 9/4416 713/2 |
| 2014/0108695 | A1 | 4/2014 | Rachakonda et al. |
| 2014/0122833 | A1* | 5/2014 | Davis .................. G06F 9/44505 712/E9.002 |
| 2014/0253565 | A1 | 9/2014 | Bakalash |
| 2015/0039787 | A1* | 2/2015 | Voorhees ............. G06F 3/0653 710/17 |
| 2015/0082420 | A1 | 3/2015 | Love et al. |
| 2015/0143037 | A1* | 5/2015 | Smith .................. G06F 3/0659 711/148 |
| 2015/0169377 | A1* | 6/2015 | Norton ................ G06F 9/455 718/104 |
| 2016/0018875 | A1* | 1/2016 | Jenne ................... G06F 1/32 710/316 |
| 2016/0378704 | A1 | 12/2016 | Adamson et al. |

OTHER PUBLICATIONS

Advisory Action for U.S. Appl. No. 16/566,576, Mailed Aug. 27, 2020, 3 pages.
Advisory Action for U.S. Appl. No. 17/207,135, Mailed Jan. 24, 2023, 3 pages.
China Office Action from related matter CN201580076992 dated Apr. 14, 2020, with English translation.
Final Office Action for U.S. Appl. No. 15/554,205, Mailed Feb. 8, 2019, 12 pages.
Final Office Action for U.S. Appl. No. 16/566,576, Mailed May 29, 2020, 10 pages.
Final Office Action for U.S. Appl. No. 17/207,135, Mailed Aug. 18, 2022, 9 pages.
First Office Action for U.S. Appl. No. 15/554,205, Mailed Sep. 6, 2018, 9 pages.
First Office Action for U.S. Appl. No. 16/566,576, Mailed Feb. 6, 2020, 10 pages.
First Office Action for U.S. Appl. No. 17/207,135, Mailed Feb. 3, 2022, 10 pages.
International Preliminary Report on Patentability and Written Opinion issued in PCT Application No. PCT/US2015/023043, dated Oct. 3, 2017, 8 pages.
International Search Report and Written Opinion issued in PCT Application No. PCT/US2015/023043, dated Dec. 28, 2015, 10 pages.
Notice of Allowance for U.S. Appl. No. 16/566,576, Mailed Nov. 13, 2020, 8 pages.
Notice of Allowance for U.S. Appl. No. 17/207,135, Mailed Feb. 23, 2023, 10 pages.
Supplementary European Search Report issued in European Patent Application No. 15887944.5, dated Oct. 30, 2018, 7 pages.

\* cited by examiner

400

```
┌─────────────────────────────────────────────────┐
│ Detect a change request, the change request to  │
│ modify a configuration of Input/Output (I/O)    │
│ controller lane access from an existing         │
│ configuration to a new configuration            │
│                                                 │
│                     410                         │
└─────────────────────────────────────────────────┘
                        │
                        ▼
┌─────────────────────────────────────────────────┐
│ Verify that the new configuration is valid      │
│ based on a stock keeping unit (SKU) associated  │
│ with the system                                 │
│                                                 │
│                     420                         │
└─────────────────────────────────────────────────┘
                        │
                        ▼
┌─────────────────────────────────────────────────┐
│ If the verification is successful, store the    │
│ new configuration in non-volatile memory and    │
│ reset the system                                │
│                                                 │
│                     430                         │
└─────────────────────────────────────────────────┘
```

FIG. 4

DYNAMIC CONFIGURATION OF INPUT/OUTPUT CONTROLLER ACCESS LANES

CROSS-REFERENCE RATED APPLICATIONS

The present application is a continuation of U.S. patent application Ser. No. 17/207,135 filed on Mar. 19, 2021, which is a continuation of U.S. patent application Ser. No. 16/566,576 filed on Sep. 10, 2019, which is a continuation of U.S. patent application Ser. No. 15/554,205 filed on Aug. 28, 2017, which is a National Stage Entry of PCT/US2015/023043 filed Mar. 27, 2015, the entire disclosures of which are incorporated herein by reference.

FIELD

The present disclosure relates to Input/Output (I/O) Controller Access, and more particularly, to dynamic configuration and enforcement of access lanes to I/O controllers.

BACKGROUND

Processor chipsets, or Systems-on-a-Chip (SoCs), are being designed to include increasing numbers of relatively high speed I/O controllers (HSIOs), such as, for example, Peripheral Component Interconnect Express (PCIe) controllers, Universal Serial Bus (USB) controllers, Ethernet controllers and Serial Advanced Technology Attachment (SATA) controllers. The SoCs may also support lower speed or general purpose I/O controllers, power delivery pins, memory controllers, etc. These controllers interface to the external world through pins. As a result, an increasing number of pins (a limited resource) of the SoC are being consumed.

One solution to this problem has been to multiplex the HSIO controllers to groups of pins (also referred to as HSIO lanes). The controller to lane selection can be accomplished in a static manner, through the use of fuses or pin straps, to create a particular configuration for each SoC product part number or SKU (stock keeping unit). Because different customers, with different application needs and budgets, may each require different numbers and combinations of each type of HSIO, the number of product variations offered for sale (each with its own SKU) may grow rapidly and become more difficult to manage.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 4 illustrates a flowchart of operations of another example embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for dynamic configuration and enforcement of mappings of I/O controllers to access lanes, for example in a System-on-a-Chip (SoC) or server platform controller hub (PCH). Embodiments of the present disclosure may thus reduce SoC pin count and simplify part provisioning (e.g., SKU numbering and inventory control). The I/O controllers may generally be relatively high speed I/O controllers such as, for example, PCIe, USB, Ethernet and SATA controllers, etc., collectively referred to herein as HSIO controllers. The system may be configured to allow a remote agent to: map/re-map lanes to HSIOs; selectively enable or disable any lane; and limit the number of available lanes to any desired maximum value. These configurable properties, which may be collectively referred to as HSIO configuration or lane configuration, may all be associated with a particular SoC SKU. The remote agent may, for example, include software executing on an OEM (Original Equipment Manufacturer) or ODM (Original Design Manufacturer) provided processor that may be configured as internal or external to the SoC and that is coupled to the system during a configuration phase, thus allowing the OEM to configure an SoC as a product that meets the particular application requirements of a customer, end user or data center.

Although embodiments of the present disclosure may be described herein with respect to certain types of HSIO controllers (e.g., PCIe, etc.) and particular SoC components, it will be appreciated that, in general, these principles may be applied to any type of SoC and HSIO controller and that the term "high speed" is a relative term. For example, 100 million transfers/second may be considered high speed for one type of SoC, while 1 billion transfers/second may be considered high speed for another type of SoC.

Figure 1:
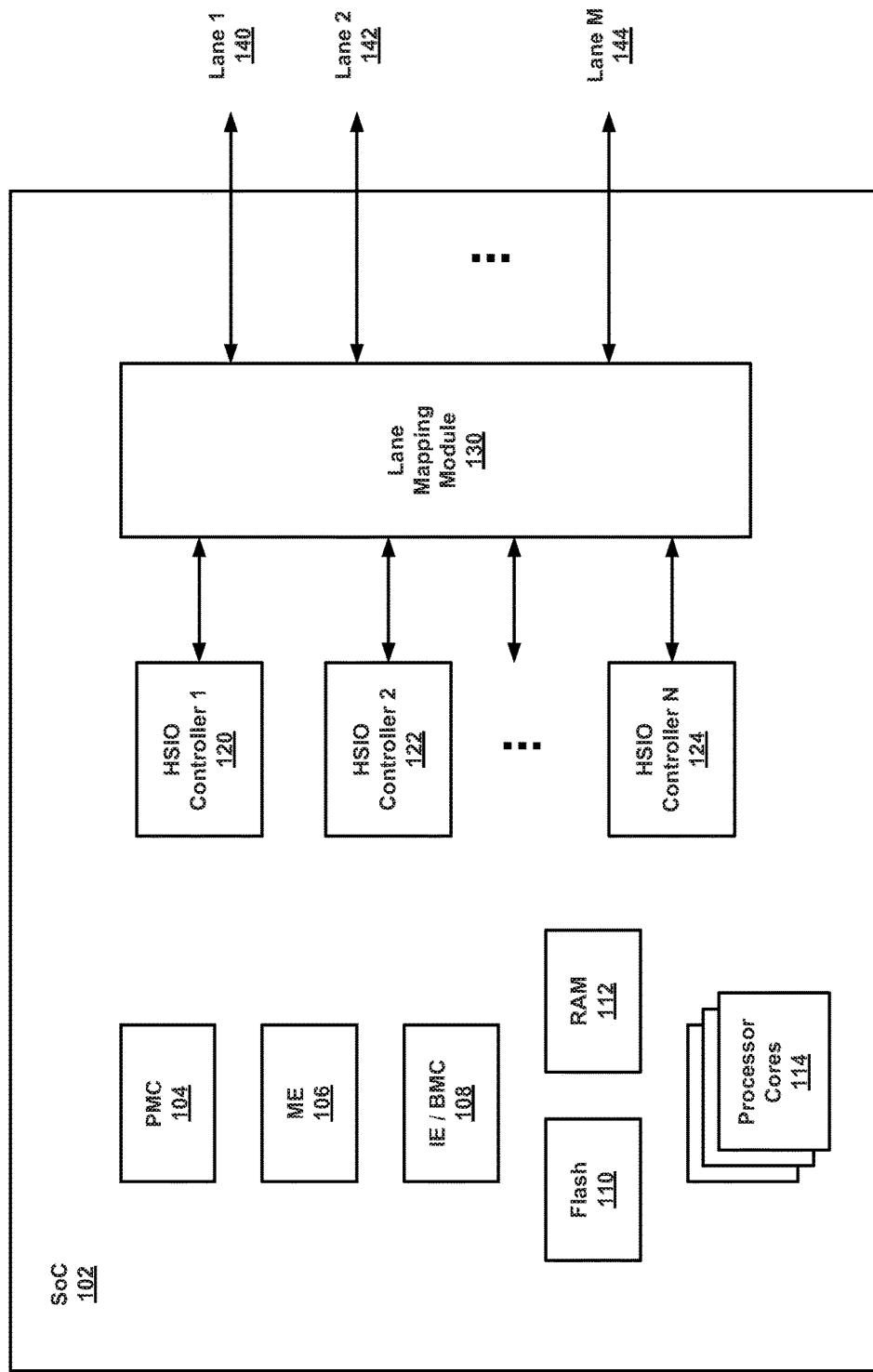
FIG. 1 illustrates a system level block diagram of an example embodiment consistent with the present disclosure.

FIG. 1 illustrates a system level block diagram 100 of an example embodiment consistent with the present disclosure. The SoC 102 is shown to include a lane mapping module 130 that is configured to map or multiplex a number (N) of HSIO controllers 120, 122 . . . 124, to access lanes 140, 142 . . . 144, as will be described in greater detail below. There may be M lanes, where M is typically less than N. In some embodiments, the SoC 102 may also include a power management controller (PMC) 104, a management engine microcontroller (ME) 106, and an innovation engine microcontroller (IE) and/or baseboard management controller (BMC) 108 that may be configured to dynamically control the HSIO/lane configurations, although, in general, any suitable processors or controllers may be used for this purpose.

The ME 106 may, in general, be an SoC specific processor that is provided to configure the SoC during an initial power-up and to provide additional capabilities including, for example, power and/or thermal management functions. In some embodiments, the ME 106 may have relatively broad/unrestricted access to most or all internal components and functions of the SoC in order to perform these tasks. Additionally, in some embodiments, access to or modification of the ME 106 (for example through firmware changes) may be limited to the SoC manufacturer/supplier.

The IE/BMC 108 may, in general, be configured to provide capabilities that are similar to the ME 106, but with increased restrictions regarding access to internal components and functions of the SoC. In some embodiments, the BMC 108 may be supplied or controlled by an OEM/ODM, as a value-added platform component to provide additional capabilities while in other embodiments the IE could be embedded in the SoC. These capabilities may include, for example, monitoring that the SoC is able to communicate with a system administrator through an independent connection, and/or providing a generic abstraction of the SoC capabilities that may be shared across different product lines.

SoC 102 may further include flash memory 110 (or other suitable non-volatile memory) to store default configuration parameters and RAM memory 112 (or other suitable volatile memory) to store override configuration parameters. The flash memory 110 may also be configured to store updated configuration parameters after verification, as will be explained below. SoC 102 may further include one or more general purpose processing cores 114, configured to execute software or applications as required by a user of the system and to perform any other suitable tasks.

A hardware (HW) SKU value that is associated with the SoC 102 may be encoded in the SoC by any suitable means that allows read only (non-modifiable) access by the various processors, controllers and/or microcontrollers. The SoC 102 may be part of a circuit board or platform as described below in connection with FIG. 5.

Figure 2:
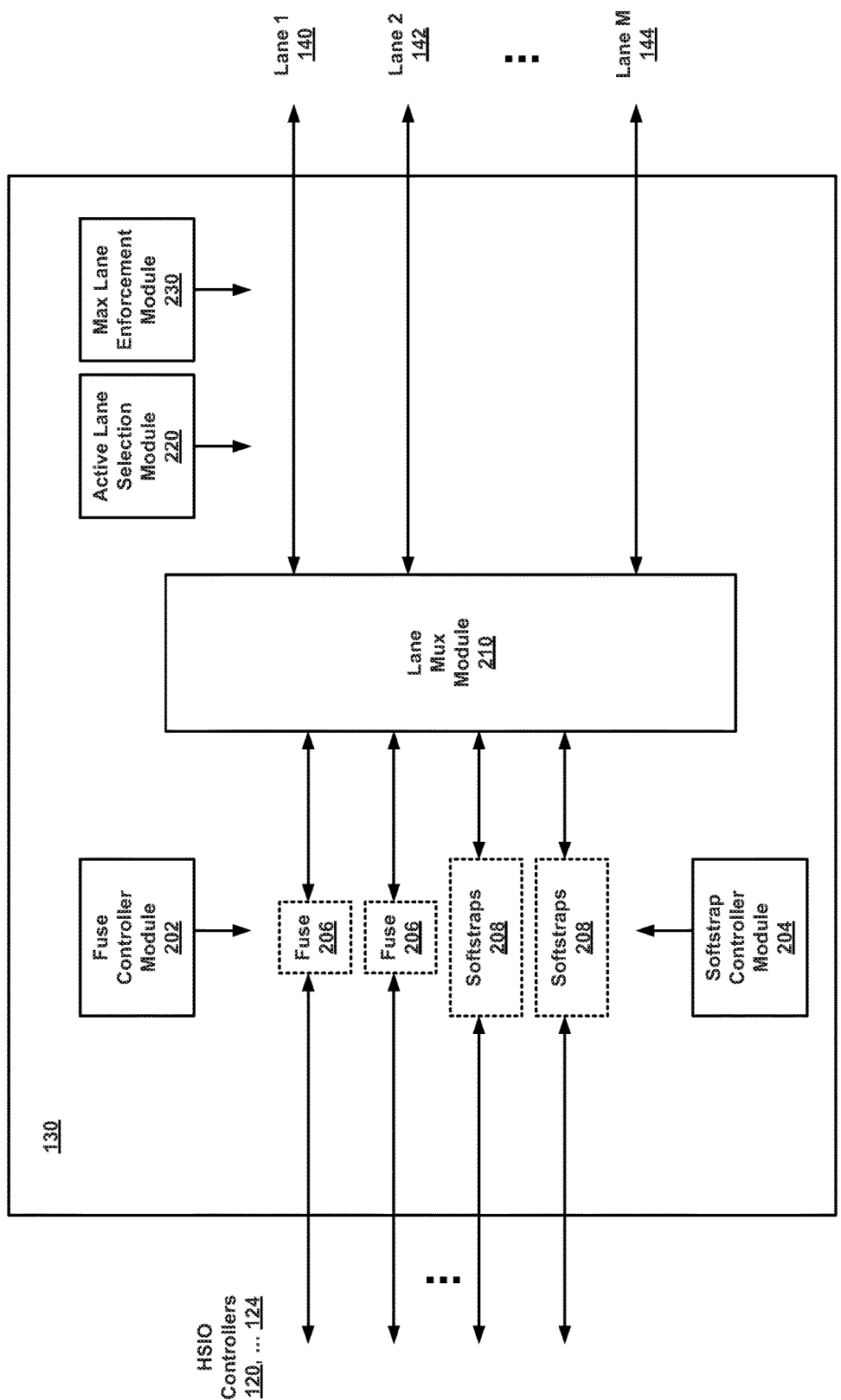
FIG. 2 illustrates a more detailed block diagram of another example embodiment consistent with the present disclosure.

FIG. 2 illustrates a more detailed block diagram 200 of an embodiment of the lane mapping module 130 consistent with the present disclosure. Lane mapping module 130 is shown to include a plurality of fuses 206 along with fuse controller module 202, and a plurality of softstraps 208 along with softstrap controller module 204. Fuses may be configured to provide electrical shorts or opens between HSIO controller signal lines and one or more of the output lanes. The fuses 206 and softstraps 208 may be controlled by fuse controller module 202 and softstrap controller module 204 respectively, based on information stored in RAM 112 to provide dynamic reconfiguration of the connections (e.g., shorts versus opens). The information may be stored in a region of the RAM 112 that is associated with or accessible to the PMC 104. Lane mapping module 130 is shown to also include a lane multiplexing module 210 configured to provide a plurality of potential paths between the HSIO controller signal lines and the output lanes. Lane mapping module 130 is shown to further include an active lane selection (or enablement) module 220 configured to enable and/or disable one or more selected lanes, for example based on the SKU. Lane mapping module 130 is shown to further include a maximum lane enforcement module 230 configured to limit the number of active lanes to a maximum threshold value, for example based on the SKU. The maximum lane count may be referred to herein as "lane width." In some embodiments, any or all of modules 202, 204, 220, 230 may be incorporated in ME 106.

Figure 3A:
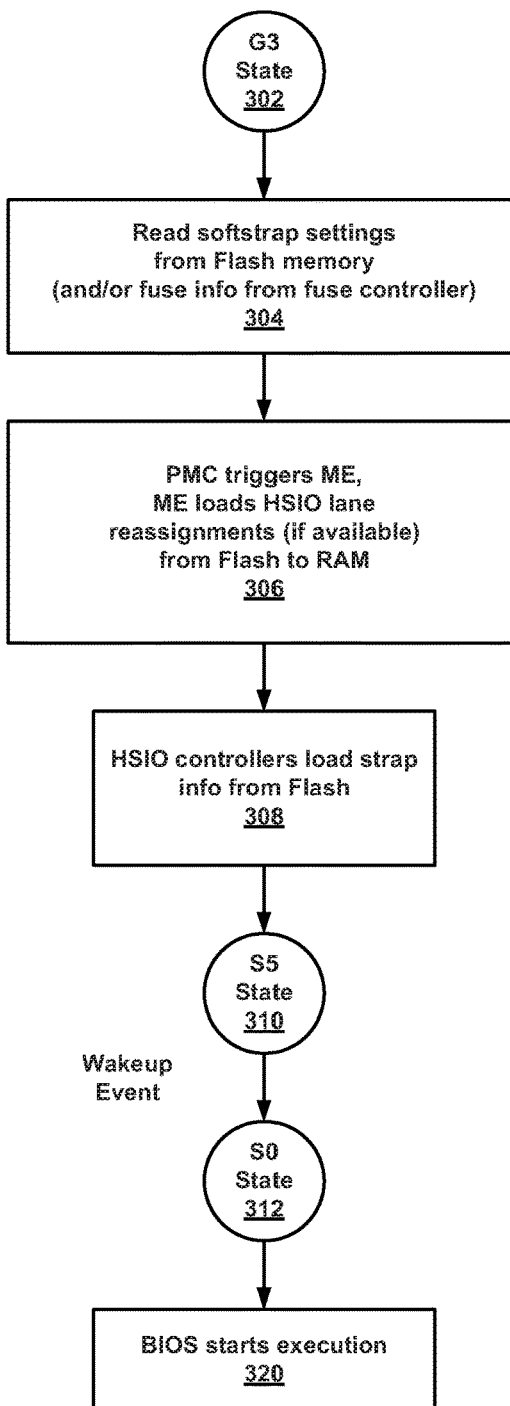
FIGS. 3(a) and 3(b) illustrate a flowchart of operations of one example embodiment consistent with the present disclosure.
Figure 3B:
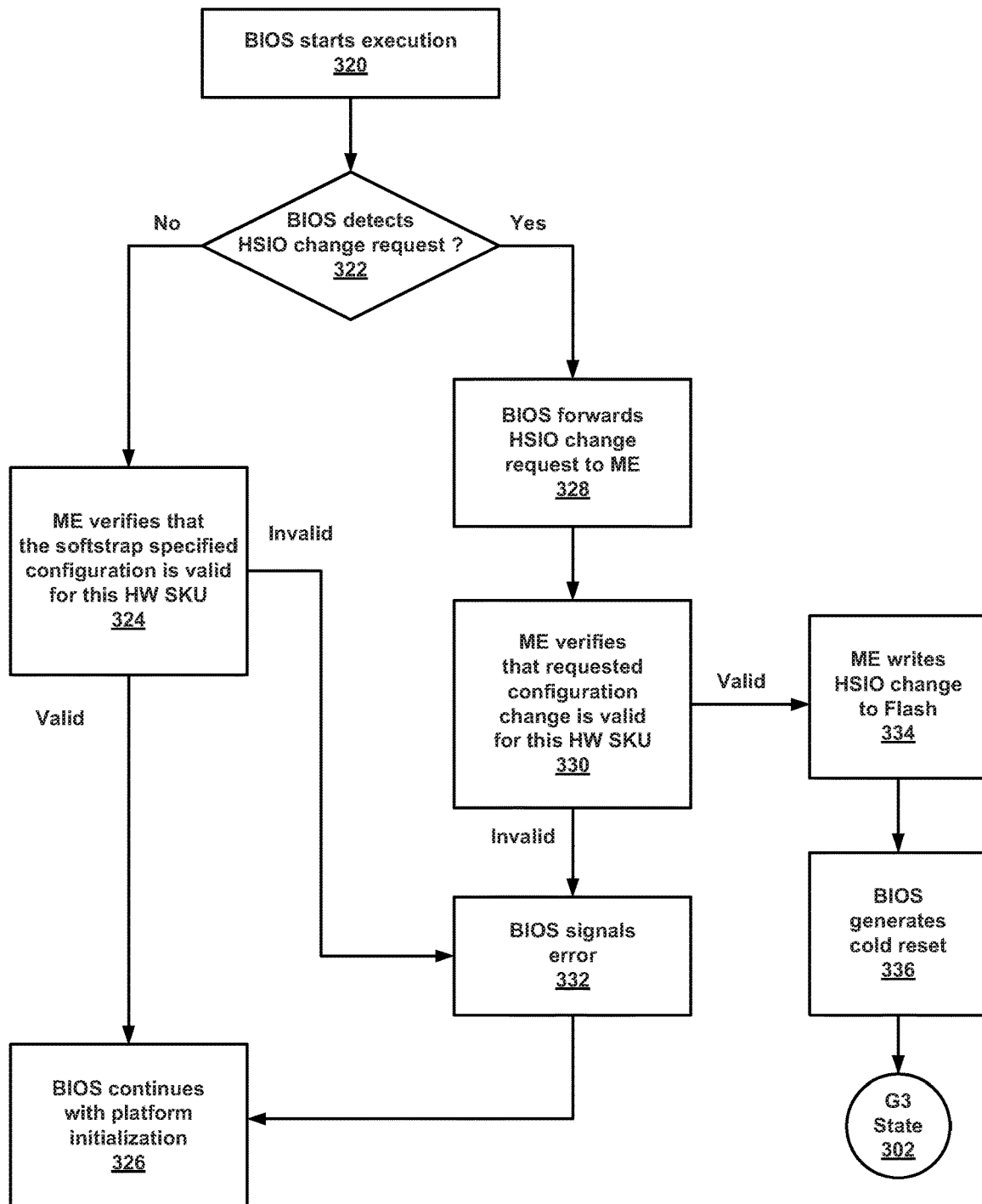

FIGS. 3(a) and 3(b) illustrate a flowchart of operations 300 of one example embodiment consistent with the present disclosure. An ME 106 processor based mechanism is shown as an example for configuration and enforcement of mappings of HSIO lanes. In the following description, the system may progress through different power states or levels, for example from a relatively lower power state (e.g., an off state or sleep state) to a relatively higher power state (e.g., an operational state). In some embodiments, the power states may comply with states that are defined in the Advanced Configuration and Power Interface (ACPI) specification, including revision 5.1. published Aug. 12, 2104. More specifically, power state G3 may represent a mechanical power off state. Power state S5 may represent a soft power off state, for example where power is supplied to the system but a full reboot is required to bring the system up. Power state S0 may represent a powered up or generally operational state, which may be triggered by a wake-up event including a keyboard or mouse event, a clock event or any other suitable type of input.

The process may begin with the system in a G3 state 302. Once power is applied. the system transitions to the S5 state 310. During this transition, the flash memory controller, at operation 304, reads default HSIO lane assignments from flash memory 110 (and/or the fuse controller module 202 reads default fuse settings) to be made available to the ME 106. The default HSIO lane assignments may also be configured in softstrap settings. Also, during this transition, at operation 306, the PMC 104 triggers the ME 106 to load HSIO lane reassignments (configuration changes), if any are available, from flash memory 110 to a region of RAM 112 that is associated with or accessible to the PMC 104. At operation 308, the HSIO controllers (and any associated analog logic controllers) read the, potentially modified, softstrap and fuse information from RAM 112, thus enabling the ME 106 to apply overrides of static fuse and softstrap settings for HSIO-to-lane mappings and for lane enablement selections.

A wake-up event may then cause the system to transition from the S5 state 310 to an S0 state 312, causing one of the processor cores 114 to fetch a reset vector and, at operation 320, to begin executing the system BIOS (Basic I/O System). Although the term BIOS is used in this disclosure, it will be understood that this term may encompass any type of firmware including, for example, Unified Extensible Firmware or other variations of boot loaders, etc. At operation 322, the BIOS checks to determine if an HSIO configuration change request has been made. Such a request may be generated by remote software or a remote agent (for example 560), the IE or BMC processor 108 or by the BIOS itself. The change request may occur at any time during the operation or startup of the system. The BIOS may communicate information/status regarding any configuration changes to the ME 106. In some embodiments, communication between BIOS and ME may be through a Host Embedded Controller Environment Control-Interface (HECI). It will be appreciated that configuration changes provided by the IE may generally be more secure than changes provided by the BIOS, because, for example, the IE firmware (FW) may be signed and verified by the IE hardware prior to execution. This is in contrast to the BIOS which can be re-programmed and thus the safety of the signature/verification process can potentially be overridden due to generic design. In some embodiments, however, it is possible for the BIOS to provide the same level of security if it is signed and verified by IE Hardware prior to execution.

If no change is detected, then at operation 324, the ME 106 verifies, for example though execution of firmware, that the current lane configuration (including lane mapping, lane enablement selection and lane width) is valid for this HW SKU. For example, the requested number of HSIO lanes may not exceed the maximum number of lanes (or lane width) allowed for this SKU. Additionally, the lane assignments should be compatible with HW fusing and other HW capabilities. The firmware may include (or consult) a database that provides a listing of valid configurations for a given SKU. The ME may confirm the validity (or invalidity) of the configuration to the BIOS, for example through the HECI or other suitable communication path.

If the configuration is valid, then the BIOS may continue with platform initialization at operation 326. If invalid, then the BIOS may generate a system error, at operation 332, and may continue with platform initialization or take any other appropriate action. In some embodiments, the system error may be signaled to the remote agent 560 so that corrective action may be taken.

If the BIOS detects an HSIO change request, then at operation 328, the BIOS forwards the change request to the ME 106. The ME 106 verifies, at operation 330, that the requested configuration change (including lane mapping, lane enablement selection and lane width) is valid for this HW SKU. The ME may confirm the validity (or invalidity) of the configuration to the BIOS, for example through the HECI or other suitable communication path. If invalid, then the BIOS may generate a system error, at operation 332, and may continue with platform initialization or take any other appropriate action. If valid, however, at operation 334, the ME writes the HSIO changes to flash memory 110 and causes the BIOS to generate a cold reset, at operation 336. The reset returns the system to the G3 state 302. The reset may or may not include a power cycle of the system.

In some embodiments, the I/O controllers may also include memory expansion and/or coherency controllers. It will be appreciated that embodiments of the present disclosure may enable multiplexing lanes between IO controllers and other types of controllers operating on different physical link layer and data link layer protocols.

FIG. 4 illustrates a flowchart of operations 400 of another example embodiment consistent with the present disclosure. The operations provide a method for configuration of Input/Output (I/O) controller lane access of a system. At operation 410, a change request is detected, for example by the ME. The change request is to modify the configuration from an existing configuration to a new configuration. The change request may occur at any time during the operation or start-up of the system (e.g., SoC). The configuration may include an I/O controller to lane mapping, a lane enablement selection or a lane width. At operation 420, the new configuration is verified to be valid based on a stock keeping unit (SKU) associated with the system. At operation 430, if the verification is successful, the new configuration is stored in non-volatile memory and the system is reset, which may or may not include a power cycle. After reset, the new configuration maybe used by the I/O controllers.

Figure 5:
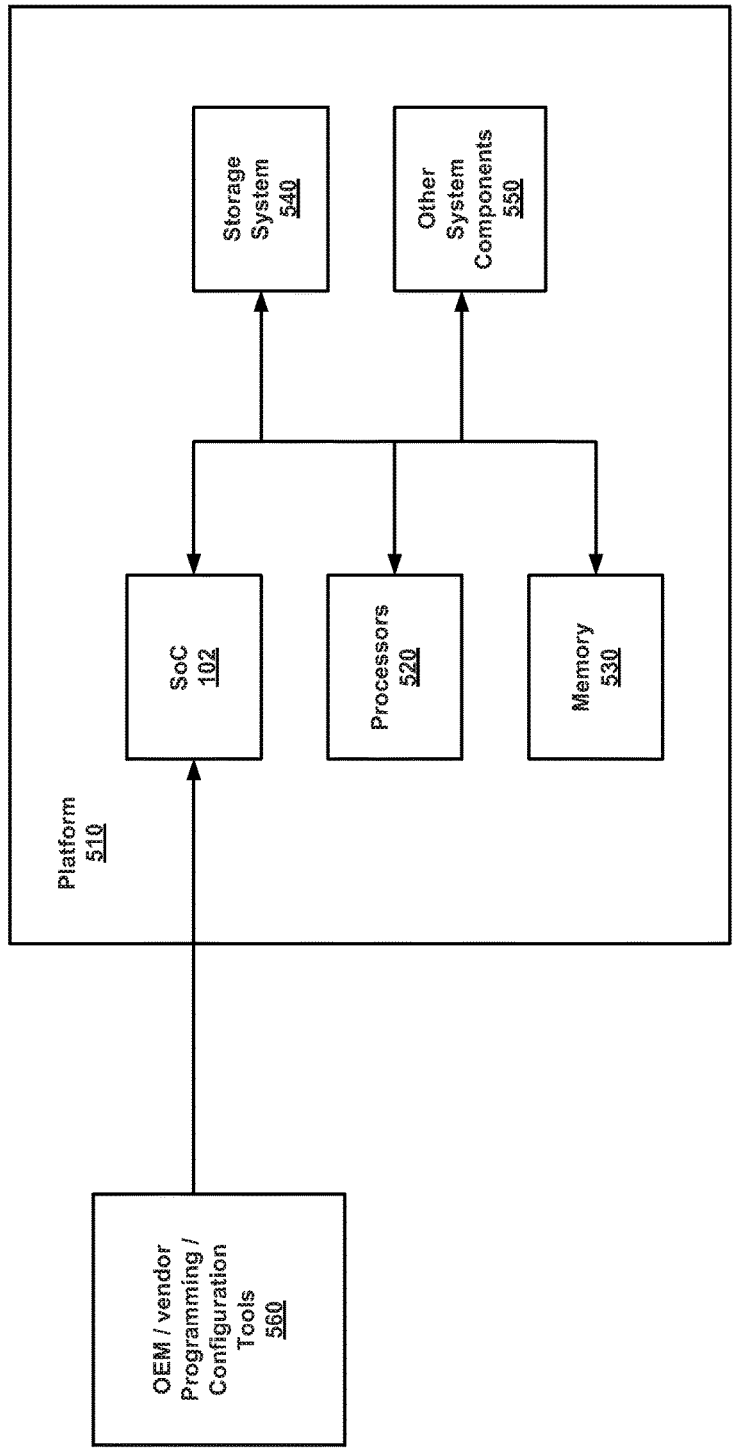
FIG. 5 illustrates a system diagram of a platform of another example embodiment consistent with the present disclosure.

FIG. 5 illustrates a system diagram 500 of one example embodiment consistent with the present disclosure. A platform 510 may be a system circuit board, computing device, workstation or desktop computer, smart phone, smart tablet, personal digital assistant (PDA), mobile Internet device (MID), convertible tablet, notebook, laptop computer, or any other suitable device.

The platform 510 is shown to include an SoC 102, to provide dynamic configuration and enforcement of HSIO access lanes, as described previously. Platform 510 may also include any number of other processors 520, memory 530, storage systems 540 and any other suitable system components 550. In some embodiments, the processors 520 may be implemented as any number of processor cores. The processor (or processor cores) may be any type of processor, such as, for example, a microprocessor, a microcontroller, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

The memory 530 may be coupled to the processors. The memory 530 may be any of a wide variety of memories (including various layers of memory hierarchy and/or memory caches) as are known or otherwise available to those of skill in the art. It will be appreciated that the processors and memory may be configured to store, host and/or execute one or more user applications or other software modules. These applications may include, but not be limited to, for example, any type of computation, communication, data management, data storage and/or user interface task. In some embodiments, these applications may employ or interact with any other components of the platform 510. Platform 510 is also shown to include a storage system 540, for example an HDD or SSD.

It will be appreciated that in some embodiments, the various components of the platform 510 may be combined in a system-on-a-chip (SoC) architecture. In some embodiments, the components may be hardware components, firmware components, software components or any suitable combination of hardware, firmware or software.

An OEM (or vendor) programming/configuration tool 560 is shown coupled to the platform 510 and, in particular, to the SoC 102. The tool 560 may be any type of processor or computing platform configured to execute software to generate HSIO configuration change requests and to communicate those requests to platform 560. The configuration change request may be generated at any time during the operation or start-up of SoC. The tool 560 may also be configured to generate and/or download firmware that is executed by the ME 106, enabling further control of the configuration process by the OEM. In some embodiments, the firmware may be written in the Quark programming language.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry." as used in any embodiment herein, may include, for example, singly or in any combination, hardwired circuitry, programmable circuitry, state machine circuitry, and/or firmware that stores instructions executed by programmable circuitry. An application (or "App") may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip. In some embodiments, a module may thus be implemented in software and/or firmware and may comprise one or more processes, threads or subroutines of a single process. Additionally, in some embodiments, a module may be distributed and executed on separate devices.

Thus, the present disclosure provides systems, devices, methods and computer readable media for dynamic configuration and enforcement of access lanes to HSIO controllers. The following examples pertain to further embodiments.

According to Example 1 there is provided a system. The system may include a plurality of Input/Output (I/O) controllers; a plurality of lanes; a lane mapping module to multiplex at least one of the I/O controllers to at least one of the lanes based on a configuration; a first processor to detect a change request, the change request to modify the configuration from an existing configuration to a new configuration; and a second processor to: verify that the new configuration is valid based on a stock keeping unit (SKU) associated with the SoC; and, if the verification is successful, store the new configuration in non-volatile memory and reset the SoC.

Example 2 may include the subject matter of Example 1, and the configuration includes an I/O controller to lane mapping, a lane enablement selection or a lane width.

Example 3 may include the subject matter of Examples 1 and 2, and the I/O controllers load the new configuration from the non-volatile memory, after the reset.

Example 4 may include the subject matter of Examples 1-3, and the verification of the new configuration further includes verifying an I/O controller to lane mapping, verifying a lane enablement selection and verifying a lane width.

Example 5 may include the subject matter of Examples 1-4, and the change request detection is performed during a power state transition of the SoC from a lower power state to a higher power state.

Example 6 may include the subject matter of Examples 1-5, and the change request is received from an agent external to the SoC.

Example 7 may include the subject matter of Examples 1-6, and the first processor is to execute a Basic Input Output System (BIOS).

Example 8 may include the subject matter of Examples 1-7, and the second processor is a management engine microcontroller.

Example 9 may include the subject matter of Examples 1-8, and the plurality of Input/Output (I/O) controllers include a Peripheral Component Interconnect Express (PCIe) controller, a Universal Serial Bus (USB) controller and/or a Serial Advanced Technology Attachment (SATA) controller.

According to Example 10 there is provided at least one computer-readable storage medium having instructions stored thereon which when executed by a processor result in the following operations for configuration of Input/Output (I/O) controller lane access of a system. The operations may include: detecting a change request, the change request to modify the configuration from an existing configuration to a new configuration; verifying that the new configuration is valid based on a stock keeping unit (SKU) associated with the system; and if the verification is successful, storing the new configuration in non-volatile memory and resetting the system.

Example 11 may include the subject matter of Example 10, and the configuration includes an I/O controller to lane mapping, a lane enablement selection or a lane width.

Example 12 may include the subject matter of Examples 10 and 11, further including providing the new configuration to the I/O controllers from the non-volatile memory, after resetting the system.

Example 13 may include the subject matter of Examples 10-12, and the verifying further includes verifying an I/O controller to lane mapping, verifying a lane enablement selection and verifying a lane width.

Example 14 may include the subject matter of Examples 10-13, further including, if the verification fails, signaling an error.

Example 15 may include the subject matter of Examples 10-14, and the change request detection is performed during a power state transition of the system from a lower power state to a higher power state.

Example 16 may include the subject matter of Examples 10-15, and the change request detection is performed by a Basic Input Output System (BIOS).

Example 17 may include the subject matter of Examples 10-16, further including receiving the change request from an agent external to the system.

According to Example 18 there is provided a method for configuration of Input/Output (I/O) controller lane access of a system. The method may include: detecting a change request, the change request to modify the configuration from an existing configuration to a new configuration; verifying that the new configuration is valid based on a stock keeping unit (SKU) associated with the system; and if the verification is successful, storing the new configuration in non-volatile memory and resetting the system.

Example 19 may include the subject matter of Example 18, and the configuration includes an I/O controller to lane mapping, a lane enablement selection or a lane width.

Example 20 may include the subject matter of Examples 18 and 19, further including providing the new configuration to the I/O controllers from the non-volatile memory, after resetting the system.

Example 21 may include the subject matter of Examples 18-20, and the verifying further includes verifying an I/O controller to lane mapping, verifying a lane enablement selection and verifying a lane width.

Example 22 may include the subject matter of Examples 18-21, further including, if the verification fails, signaling an error.

Example 23 may include the subject matter of Examples 18-22, and the change request detection is performed during a power state transition of the system from a lower power state to a higher power state.

Example 24 may include the subject matter of Examples 18-23, and the change request detection is performed by a Basic Input Output System (BIOS).

Example 25 may include the subject matter of Examples 18-24, further including receiving the change request from an agent external to the system.

Example 26 may include the subject matter of Examples 18-25, further including generating the change request on a processor of the system.

According to Example 27 there is provided a system for configuration of Input/Output (I/O) controller lane access of a system. The system may include: means for detecting a change request, the change request to modify the configuration from an existing configuration to a new configuration; means for verifying that the new configuration is valid based on a stock keeping unit (SKU) associated with the system; and if the verification is successful, means for storing the new configuration in non-volatile memory and resetting the system.

Example 28 may include the subject matter of Example 27, and the configuration includes an I/O controller to lane mapping, a lane enablement selection or a lane width.

Example 29 may include the subject matter of Examples 27 and 28, further including means for providing the new configuration to the I/O controllers from the non-volatile memory, after resetting the system.

Example 30 may include the subject matter of Examples 27-29, and the verifying further includes means for verifying an I/O controller to lane mapping, verifying a lane enablement selection and verifying a lane width.

Example 31 may include the subject matter of Examples 27-30, further including, if the verification fails, means for signaling an error.

Example 32 may include the subject matter of Examples 27-31, and the change request detection is performed during a power state transition of the system from a lower power state to a higher power state.

Example 33 may include the subject matter of Examples 27-32, and the change request detection is performed by a Basic Input Output System (BIOS).

Example 34 may include the subject matter of Examples 27-33, further including means for receiving the change request from an agent external to the system.

Example 35 may include the subject matter of Examples 27-34, further including means for generating the change request on a processor of the system.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The invention claimed is:

1. An apparatus comprising:
    a plurality of multithreaded processor cores to execute instructions;
    a plurality of input/output (IO) controllers coupled to the plurality of multithreaded processor cores, the plurality of IO controllers including one or more serial advanced technology attachment (SATA) controllers and one or more Peripheral Component Interconnect Express (PCIe) controllers;
    a plurality of IO controller signal lines, respective ones of the plurality of IO controllers to communicate over a corresponding group of the IO controller signal lines in accordance with a corresponding IO protocol; and
    a plurality of lanes, each lane of the plurality of lanes associated with a group of pins;
    a lane mapping circuitry including a lane multiplexer to select from a plurality of communication paths between the plurality of lanes and the IO controller signal lines;
    a power management controller to control power states associated with the plurality of multithreaded processor cores and the plurality of lanes;
    a management controller to control the lane mapping circuitry during a transition of the apparatus from a powered off state to a powered state in accordance with default configuration information providing a default mapping of the plurality of IO controller signal lines or portions thereof to the plurality of lanes, the default configuration information read from a non-volatile memory,
    wherein, based on the default mapping, the lane mapping circuitry is to couple sets of IO controller signal lines to sets of lanes of the plurality of lanes;
    lane enablement circuitry configured to selectively enable and/or disable one or more lanes of the plurality of lanes.

2. The apparatus of claim 1 further comprising:
    read-only stock keeping unit (SKU) circuitry to provide an encoded SKU value corresponding to the apparatus;
    wherein the management controller is to verify though execution of firmware that the default mapping of the plurality of IO controller signal lines or portions thereof to the plurality of lanes is valid and/or that the lanes selectively enabled or disabled are valid in accordance with the SKU value.

3. The apparatus of claim 1, further comprising: circuitry to limit a number of active lanes to a maximum value.

4. The apparatus of claim 1, wherein the default mapping comprises configuration information stored in the non-volatile memory.

5. The apparatus of claim 4, wherein the default configuration information is to be provided by software or firmware executed by a processor.

6. The apparatus of claim 1, wherein the management controller is to dynamically control the lane mapping circuitry to couple the sets of IO controller signal lines to the sets of lanes of the plurality of lanes.

7. The apparatus of claim 4, wherein the management controller is to verify that a number of enabled lanes of the plurality of lanes does not exceed a maximum number of lanes allowed for an encoded stock keeping unit (SKU) value.

8. The apparatus of claim 1, wherein the lane mapping circuitry comprises a plurality of fuses or softstraps to be configured based on the default configuration information to couple the sets of IO controller signal lines to the sets of lanes of the plurality of lanes.

9. The apparatus of claim 1, wherein the default configuration information is to be provided through a Host Environment Control Interface.

10. The apparatus of claim 1, wherein the multithreaded processor cores include more than one hardware thread context or logical processor per multithreaded processor core.

11. The apparatus of claim 5, wherein at least a portion of the software or firmware is provided by a basic input-output system (BIOS) during a boot sequence of the apparatus during the transition from the powered off state to the powered state.

12. The apparatus of claim 1, further comprising at least one of: a digital signal processor (DSP), a graphics processor, a network processor, and a field-programmable gate array (FPGA) configured to execute code.

13. The apparatus of claim 1, further comprising: a dynamic random access memory (DRAM) and a cache memory coupled to the plurality of multithreaded processor cores.

14. A system comprising:
a dynamic random access memory (DRAM) to store instructions;
a plurality of multithreaded processor cores coupled to the DRAM to execute the instructions;
a storage system coupled to the plurality of multithreaded processor cores, the storage system to store data;
a plurality of input/output (IO) controllers coupled to the plurality of multithreaded processor cores, the plurality of IO controllers including one or more serial advanced technology attachment (SATA) controllers and one or more Peripheral Component Interconnect Express (PCIe) controllers;
a plurality of IO controller signal lines, respective ones of the plurality of IO controllers to communicate over a corresponding group of the IO controller signal lines in accordance with a corresponding IO protocol; and
a plurality of lanes, each lane of the plurality of lanes associated with a group of pins;
lane mapping circuitry including a lane multiplexer to select from a plurality of communication paths between the plurality of lanes and the IO controller signal lines,
a power management controller to control power states associated with the plurality of multithreaded processor cores and the plurality of lanes;
a management controller to control the lane mapping circuitry during a transition of the apparatus from a powered off state to a powered state in accordance with default configuration information providing a default mapping of the plurality of IO controller signal lines or portions thereof to the plurality of lanes, the default configuration information read from a non-volatile memory,
wherein, based on the default mapping, the lane mapping circuitry is to couple sets of IO controller signal lines to sets of lanes of the plurality of lanes;
lane enablement circuitry configured to selectively enable and/or disable one or more lanes of the plurality of lanes.

15. The system of claim 14, further comprising:
read-only stock keeping unit (SKU) circuitry to provide an encoded SKU value corresponding to the apparatus;
wherein the management controller is to verify though execution of firmware that the default mapping of the plurality of IO controller signal lines or portions thereof to the plurality of lanes is valid and/or that the lanes selectively enabled or disabled are valid in accordance with the SKU value.

16. The system of claim 14, further comprising: circuitry to limit a number of active lanes to a maximum value.

17. The system of claim 14, wherein the default mapping comprises configuration information stored in the non-volatile memory.

18. The system of claim 17, wherein the default configuration information is to be provided by software or firmware executed by a processor.

19. The system of claim 14, wherein the management controller is to dynamically control the lane mapping circuitry to couple the sets of IO controller signal lines to the sets of lanes of the plurality of lanes.

20. The system of claim 17, wherein the management controller is to verify that a number of enabled lanes of the plurality of lanes does not exceed a maximum number of lanes allowed for an encoded stock keeping unit (SKU) value.

21. The system of claim 14, wherein the lane mapping circuitry comprises a plurality of fuses or softstraps to be configured based on the default configuration information to couple the sets of IO controller signal lines to the sets of lanes of the plurality of lanes.

22. The system of claim 14, wherein the default configuration information is to be provided through a Host Environment Control Interface.

23. The system of claim 14, wherein the multithreaded processor cores include more than one hardware thread context or logical processor per multithreaded processor core.

24. The system of claim 18, wherein at least a portion of the software or firmware is provided by a basic input-output system (BIOS) during a boot sequence of the system during the transition from the powered off state to the powered state.

25. The system of claim 14, further comprising at least one of: a digital signal processor (DSP), a graphics processor, a network processor, and a field-programmable gate array (FPGA) configured to execute code.

26. The system of claim 14, further comprising: a dynamic random access memory (DRAM) and a cache memory coupled to the plurality of multithreaded processor cores.

* * * * *